(12) United States Patent
Lee (10) Patent No.: US 6,341,354 B1
(45) Date of Patent: Jan. 22, 2002

(54) ENERGY-CONSERVING COMPUTER ACCESSIBLE REMOTELY AND INSTANTANEOUSLY BY PROVIDING KEEP-ALIVE POWER TO MEMORY (75) Inventor: Howard Hong-Dough Lee, Bloomfield, MI (US)

(73) Assignee: SmartPower Corporation, Bloomfield, MI (US)

( * ) Notice: Subject to any disclaimer, the term of this patent is extended or adjusted under 35 U.S.C. 154(b) by 0 days.

(21) Appl. No.: 09/293,089

(22) Filed: Apr. 16, 1999

(51) Int. Cl.[7] .................................................. G06F 1/32
(52) U.S. Cl. ..................................................... 713/324
(58) Field of Search ................................ 713/300–340

(56) References Cited

U.S. PATENT DOCUMENTS

| | | | | |
|---|---|---|---|---|
| 5,237,698 A | * | 8/1993 | Ohmae .......................... 714/23 |
| 5,283,905 A | * | 2/1994 | Saadeh et al. ............... 713/324 |
| 5,410,713 A | * | 4/1995 | White et al. ................. 395/750 |
| 5,491,721 A | * | 2/1996 | Cornelius et al. ............ 375/222 |
| 5,513,361 A | * | 4/1996 | Young .......................... 395/750 |
| 5,579,524 A | * | 11/1996 | Kikinis ......................... 395/750 |
| 5,588,054 A | * | 12/1996 | Shin et al. ................... 379/413 |
| 5,604,709 A | * | 2/1997 | Price ............................ 365/229 |
| 5,629,694 A | * | 5/1997 | Simon et al. ................. 341/22 |
| 5,742,514 A | * | 4/1998 | Bonola ................... 364/528.21 |
| 5,848,281 A | * | 12/1998 | Smalley et al. ............. 713/322 |
| 6,098,175 A | * | 8/2000 | Lee ............................. 713/320 |

* cited by examiner

Primary Examiner—Sumati Lefkowitz (57) ABSTRACT

An energy-conserving computer system allowing for instantaneous and remote access using keep-alive power-distributing circuitry for continuously distributing keep-alive DC power to a first group of circuitry including keep-alive memory means (such as ROM, RAM, or preferably SRAM) for storing task information (reflecting the operating activity of the energy-conserving computer system) to be kept alive, and switchable power-distributing circuitry for selectively distributing main DC power to a second group of circuitry, the switchable power-distributing circuitry including a plurality of slots for detachably establishing circuit communication with circuit cards to be selectively powered.

36 Claims, 6 Drawing Sheets

ENERGY-CONSERVING COMPUTER ACCESSIBLE REMOTELY AND INSTANTANEOUSLY BY PROVIDING KEEP-ALIVE POWER TO MEMORY

FIELD OF THE INVENTION

The present invention relates to computer, and more particularly to an energy-conserving computer system utilizing keep-alive and switchable power-distributing circuitry to separately energize only needed keep-alive and main memory modules and other circuitry so as to utilize the least amount of power technologically possible to render the energy-conserving computer system remotely accessible as well as instantaneously actuatable.

BACKGROUND OF THE INVENTION

In today's society, not only are jillions of computer in service, but more and more new units will be manufactured and sold. As a result, power or energy waste can be accumulated to an alarming amount even if each unit is inefficient in power conserving for a few watts. Inefficiency in energy usage also correspondingly shortens the operating hours of a battery used in a notebook computer system.

A modern computer system is mostly equipped with a modem for sending and receiving facsimile information as well as for accessing internet information. Thus far, however, it cannot replace a typical fax machine because of its inconvenience in usage and inefficiency in power consumption. Inconvenience in usage is directly associated with the booting process of computer from a power-off state to an operating state, which may require up to 2 minutes of time. In contrast, any fax machine is readily operable for receiving or transmitting facsimile information. With respect to power consumption, a conventional fax machine requires roughly 10 watts of power in order to maintain its standby state for detecting an incoming call of facsimile information. However, much higher power is necessary for placing a conventional computer system to a corresponding standby state, in which its power supply unit (including a cooling fan), motherboard (including expansion cards), hard-disk drive, CD drive, and monitor will all incur various degrees of energy waste and also reduce mechanical/electronic life expectancy.

Recently, a great deal of effort has been made to conserve power usage in information-processing apparatuses, for example, U.S. Pat. Nos. 5,491,721 and 5,588,054 dealing with modems, and U.S. Pat. No. 5,410,713 dealing with computer systems. The prior arts basically improve power utilization after AC power is converted to regulated DC power through utilizing a power management processor to place a computer system selectively between a normal state and a standby state. However, improvement of a modem alone can neither enable its associated power-supply unit to operate more power-efficiently nor resolve the inconvenience mentioned hereinabove. Neither U.S. Pat. No. 5,410,713 teaches that the cooling fan of a power-supply unit should also be controlled to conserve power consumption.

U.S. Pat. No. 5,579,524 suggests a power supply system utilizing a command supply (i.e., switchable) to power both a fan and peripherals, which may not be desirable in view of U.S. Pat. No. 5,513,361 describing a fan controllable to dissipate heat discharged from its host CPU (central processing unit). Similar to other prior arts, U.S. Pat. No. 5,579,524 also defines that its standby state represents the lowest power consumption mode for a computer system, equivalent to turning the computer off, and thus a user should save work in progress, close applications, and exit to the system prompt. Consequently, in accordance with the conventional practice, no previous task or activity is restorable or resumable once a computer system enters the conventional standby state. In fact, it is highly desirable to maintain an application software program active so as to allow a computer system to be instantaneously and remotely accessible for receiving facsimile information once an incoming call is detected and so as to enable a user to instantaneously continue his/her unfinished tasks or files without reloading the software and the files. These features are attainable for a conventional computer that continuously maintains a sleep mode, but mechanical failure and electronic durability that can lead to reduced life expectancy will become the center issue of concern.

While U.S. Pat. No. 5,579,524 deals with supplying main power selectively to system board as a whole, U.S. Pat. No. 5,629,694 discloses a new keyboard with a power control key and suggests that its system board is divided into three zones energized respectively by battery power, standby power, and main power. The former affords neither power conserving nor instantaneous accessibility because its system board as a whole is energized and de-energized, respectively. On the other hand, the latter defines that the elements energized selectively by main power are standard subsystem (such as RAMs, ROMs, disc drives), expansion buses, etc. Removal of its main power will disable the operation of not only disk drives and expansion cards but RAMs and ROMs. Because of losing all vital information stored in the RAMs, the computer system inevitably requires another booting procedure in order to read information stored on ROMs and to reload software to RAMs. As a result, once entering the standby state, the conventional computer system becomes neither operative nor accessible instantaneously.

My allowed prior patent application (Ser. No. 09/026,032) discloses an energy-conserving power-supply system having keep-alive power and a control system for actuating the supply of either main DC power or AC power so as to maximize energy savings. The present application takes consideration of the shortcomings of the prior art mentioned hereinabove and thus aims to integrate the energy-conserving power-supply system with an energy-conserving motherboard so as to provide a new type of line-operated or battery-operated computer with characteristics of not only optimized energy savings and extended battery life but instantaneous and remote accessibility, thus totally eliminating conventional, time-consuming, manual shutdown and booting processes, for the first time.

SUMMARY OF THE INVENTION

Accordingly, a first primary embodiment of the present invention is to provide an energy-conserving computer system comprising (a) keep-alive power-distributing circuitry for continuously distributing keep-alive DC power to a first group of circuitry comprising keep-alive memory means (such as ROM, RAM or preferably SRAM) for storing task information (reflecting the operating activity of the energy-conserving computer system) to be kept alive, and (b) switchable power-distributing circuitry for selectively distributing main DC power to a second group of circuitry, wherein the switchable power-distributing circuitry comprises a plurality of slots (i.e., input/output connector means) for detachably establishing circuit communication with circuit cards to be selectively powered. Preferably, the keep-alive power-distributing circuitry further comprises at least one slot for detachably establishing circuit communication with the keep-alive memory means and/or an expansion card such as a fax card and a network card to be kept alive. The switchable power-distributing circuitry powers expansion cards (e.g., video, sound, and main volatile memory cards) as well as peripheral drives (e.g., hard-disk, CD, and floppy-disk drives), only when needed. Preferably comprised is second switchable power-distributing circuitry with a thermostat for independently actuating a cooling fan when the internal temperature exceeds a preset value. An energy-conserving notebook computer is afforded with an operable means adapted to automatically actuate an operating state and a keep-alive state when its screen is moved respectively to a viewable position and to a non-viewable position, in which opened (or modified) files and task information will be automatically saved and switchable power-distributing circuitry will be deactivated when entering the keep-alive state, and previous tasks will be restored when entering the operating state. Also preferred is a partial operating state in which the files are loaded to keep-alive memory means for manipulation but power to peripheral drives is deactivated, so as to conserve energy, to reduce mechanical wearing, and to improve operating efficiency. The energy-conserving computer system not only is remotely accessible by a modem for receiving facsimile information but is instantaneously restorable to resume previous activity through use of the very least amount of power technologically possible.

A second primary embodiment of the present invention is to provide an energy-conserving computer motherboard comprising (a) keep-alive power-distributing circuitry for continuously distributing keep-alive DC power at least to keep-alive memory for storing task information needed to be kept alive, and (b) switchable power-distributing circuitry for selectively distributing main DC power to a plurality of slots provided for detachably establishing circuit communication with circuit cards including a video card, a sound card, main volatile memory modules (such as RAM or DRAM) to be selectively powered. Preferably, the keep-alive power-distributing circuitry further comprises at least one slot for detachably establishing circuit communication with the keep-alive memory and/or an expansion card to be kept alive. The slots comprised in the keep-alive and the switchable power-distributing circuitry are rendered visually distinguishable from each other so as to allow a user to install keep-alive and switchable expansion cards properly. Further afforded are jumpers for changing the configuration between the keep-alive and the switchable power-distributing circuitry. Accordingly, the computer motherboard is rendered not only remotely accessible by a modem for receiving facsimile information but instantaneously restorable to resume previous activity.

A third primary embodiment of the present invention is to provide an operating system for use in an energy-conserving computer system comprising keep-alive memory and main volatile memory, wherein the operating system comprises the steps of (a) storing (or updating) task information needed to be kept alive to the keep-alive memory, when receiving a first signal to deactivate the main volatile memory, and (b) restoring previous tasks in accordance with the task information, when receiving a second signal to activate the main volatile memory. Preferably, the task information to be kept alive includes the names of the software programs and the files previously opened, the status of their activeness, and the last position of a cursor in each of the files.

A fourth primary embodiment of the present invention is to provide an energy-conserving mouse system comprising a manual operable means and interfacing means, wherein the interfacing means is provided for establishing circuit communication between the manual operable means and a host computer system having keep-alive and switchable power-distributing circuitry, and the manual operable means is actuatable for requesting the host computer system to enter a keep-alive state in which the switchable power-distributing circuitry is deactivated.

A fifth primary embodiment of the present invention is to provide an energy-conserving power-supply system for use in computer, comprising (a) keep-alive power-distributing circuitry for continuously distributing keep-alive power, (b) first switchable power-distributing circuitry for selectively distributing main DC power, (c) second switchable power-distributing circuitry for selectively outputting power selected from the group consisting of DC power, AC power and regulated DC power, and (d) cooling means coupled only to the second switchable power-distributing circuitry, for dissipating heat. This renders the cooling fan of the energy-conserving power-supply system independently or temperature-sensitively actuatable, which is distinctly different from the conventional practice.

DETAILED DESCRIPTION OF THE PREFERRED EMBODIMENT

Figure 1:
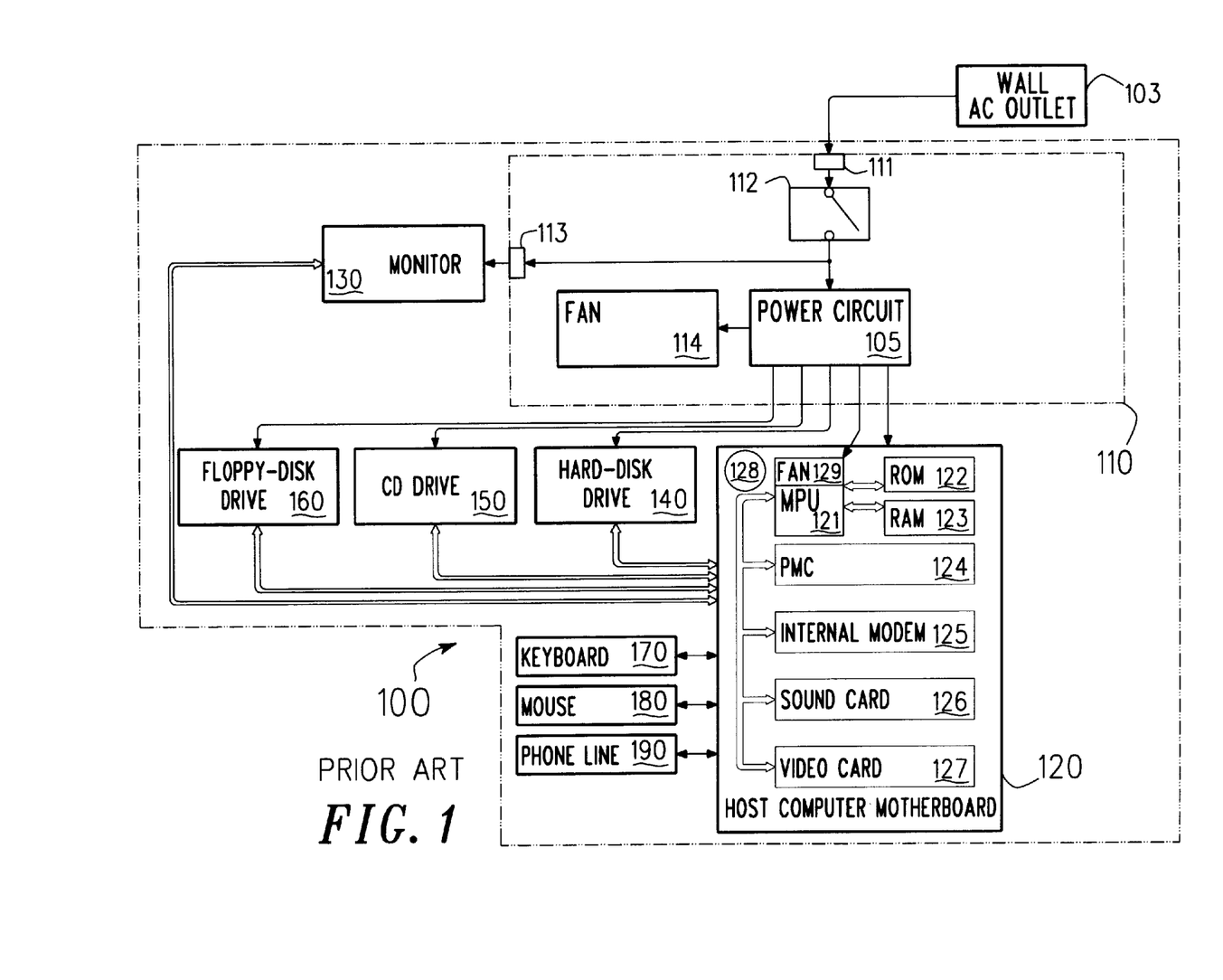
FIG. 1 is a block diagram of a conventional computer system.

In conventional practice, FIG. 1, a line-operated power-supply unit 110 utilized in a computer system 100 basically contains an AC-power receptacle 111, a manual power switch 112 for manually inputting AC power (either 115 or 220 VAC) from a wall AC outlet (i.e., an external AC source) 103, an AC outlet 113 for outputting 115 VAC to power a monitor 130 at the same time, a cooling fan 114, and a power circuit 105. Power circuit 105 has several DC-power outputs (including ±12 VDC, ±5 VDC, powergood, and ground lines) for supplying regulated DC power to a host computer motherboard 120, a hard-disk drive 140, a CD drive 150, and a floppy-disk drive 160. In circuit communication with motherboard 120, each of the last three drives receives +12 VDC and +5 VDC directly from power circuit 105. Motherboard 120 is mounted with a microprocessor (MPU) 121, read only memory (ROM) 122, random-access memory (RAM) 123, a power management circuit (PMC) 124, an internal modem 125, a sound card 126, a video card 127, and a battery 128. A fan 129 mounted on MPU 121 always keeps rotating in order to remove heat dissipated from MPU 121. Motherboard 120 is also in circuit communication with a keyboard 170, a mouse 180, and a phone line 190. PMC 124 renders computer system 100 operable in several states including an off, standby, or suspended state for conserving power.

In accordance with the conventional practice, substantial energy waste is inevitable even if computer system 100 is placed in its standby state. First, power-supply unit 110 has to continuously supply regulated DC power to the entire circuitry of motherboard 120, including the whole entity of MPU 121, all memory modules (RAM and ROM), all expansion slots and respective expansion cards or boards 124–127. Second, the cooling fan for dissipating heat generated by the power-supply unit is designed to rotate continuously, once computer system 100 is turned on, thus incurring energy waste even in the standby or off state. Third, regulated DC power is continuously supplied to peripheral drives including hard-disk drive 140, CD drive 150, and floppy-disk drive 160. Fourth, AC power output to an external line-operated device (for example, monitor 130) is not signal actuatable; thus, energy waste is inevitable not only within but outside the computer system, once AC power is turned on. On the other hand, once entering the conventional power-off state, computer system 100 receives no power and all information previously stored in RAM will be lost totally. Consequently, no previous task is restorable or resumable, even if computer system 100 can be remotely actuated.

Accordingly, the first and second third primary preferred embodiments of the present invention are to provide an energy-conserving computer system and an energy-conserving motherboard, respectively. The primary focus is to utilize the very least amount of power technologically possible to render a computer system remotely accessible by a modem, for instance, and instantaneously restorable to resume previous activity, especially.

Figure 2:
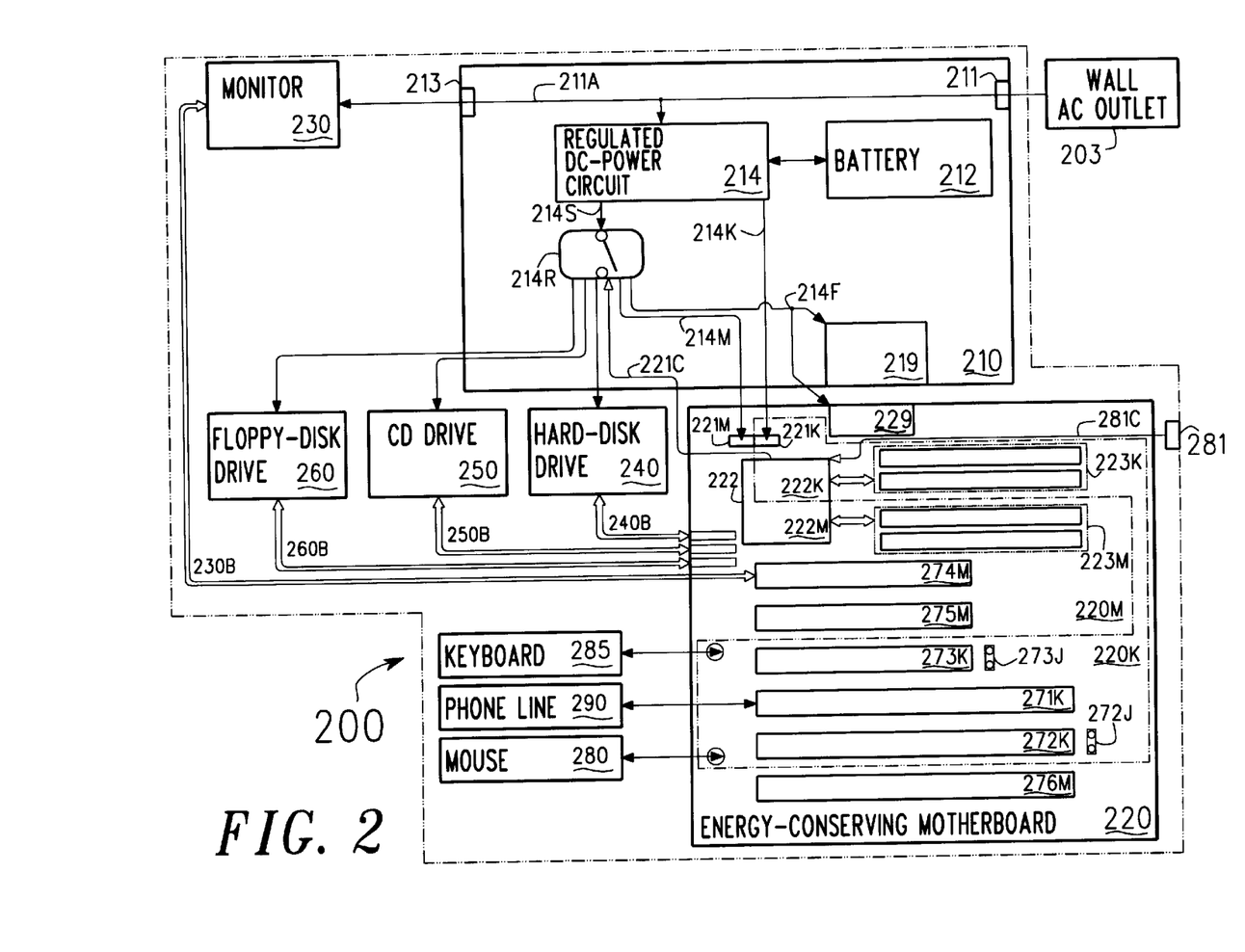
FIG. 2 is a block diagram of an energy-conserving computer system comprising energy-conserving power-supply system and motherboard, in accordance with first and second primary preferred embodiments of the present invention.

Referring now to FIG. 2, illustrated is a block diagram of an energy-conserving computer system 200 utilizing an energy-conserving power-supply system 210 in conjunction with an energy-conserving motherboard 220. Comprised in energy-conserving power-supply system 210 are an AC-power receptacle 211 for receiving AC power from a wall AC outlet 203 (i.e., an external AC source), an AC-power supply 211A output to an AC outlet 213, a keep-alive power supply 214K, and a switchable DC-power supply 214S. Both keep-alive power supply 214K and switchable DC-power supply 214S are from a regulated DC-power circuit 214 that is coupled to AC-power receptacle 211 for converting the AC power received therefrom to regulated DC power. A rechargeable battery 212 is further provided for supplying backup DC power to regulated DC-power circuit 214 for distribution, when needed. Switchable DC-power supply 214S has a plurality of outlets including a power line 214M for supplying main DC power with various voltage outputs to a main power connector 221M stationarily disposed on energy-conserving motherboard 220, lines 214F for energizing a fan 219 enclosed in energy-conserving power-supply system 210 and a fan 229 disposed on a microprocessor (or CPU) 222, and power lines for energizing secondary storage including a hard-disk drive 240, a CD drive 250, and a floppy-disk drive 260. The distribution of switchable DC-power supply 214S to the various outlets is controlled by a relay 214R that is signal controllable through an interface line 221C in circuit communication with keep-alive CPU circuitry 222K of microprocessor 222, so as to be rendered capable of receiving a control signal during a keep-alive state.

In brief, energy-conserving power-supply system 210 includes keep-alive power-distributing circuitry for continuously supplying low-amperage DC power (e.g., 500 mA or less) and switchable power-distributing circuitry for selectively supplying high-amperage DC power (typically, from 1 to 24 A) only when needed.

Comprised in energy-conserving motherboard 220 are keep-alive power-distributing circuitry 220K and switchable power-distributing circuitry 220M, which is totally different from motherboard 120 in a conventional type from the view point of power distributing and characteristics. More specifically, energy-conserving motherboard 220 is afforded with a keep-alive power connector for receiving keep-alive power supply 214K and with main power connector 221M for receiving main DC power through power line 214M, so as to consume the least amount of power technologically possible in the keep-alive state. Further comprised in energy-conserving motherboard 220 are microprocessor 222 having keep-alive CPU circuitry 222K and main CPU circuitry 222M, keep-alive memory modules 223K and main memory modules 223M, keep-alive expansion slots 271K–273K and switchable expansion slots 274M–276M, and jumpers 272J and 273J. Preferably, keep-alive CPU circuitry 222K servers as a center control for controlling an activity of relay 214R in the keep-alive state, so as to selectively activate the switchable power-distributing circuitry. Both keep-alive memory modules 223K and main memory modules 223M may be rewritable random access memory (i.e., primary memory) that is fast in speed but volatile in nature. However, because of being continuously powered, keep-alive memory modules 223K become non-volatile in effect. Preferably, keep-alive memory modules 223K are SRAM (static random-access memory) chips or modules and/or a combination of SRAM and ROM modules. Use of the SRAM modules eliminates the need to refresh the contents of information stored therein many times a second; thus, the task information needed to be kept alive can be retained through power of a small battery during the keep-alive state. Use of ROM chips or modules allows some preset basic operating instructions (such as a flowchart to be discussed in FIG. 3) to be resident without loading software each time. Jumpers 272J and 273J each with two pins respectively render expansion slots 272K and 273K selectively alive (currently) and inactive (when opened) in the keep-alive state, allowing the keep-alive and switchable power-distributing circuitry to be manually reconfigured at need.

Expansion slots are input/output (I/O) connectors in effect. Modem and network cards can be detachably established circuit connection with ISA-bus-type expansion slots 271K and 272K, so as to be kept alive for receiving facsimile information and for being interfaced by a LAN (local area network). Another ISA-bus-type slot 276M can be used to detachably establish circuit connection with a 16-bit sound card. Expansion slot 274M is of a PCI-bus type suitable for detachably establishing circuit connection with a 32-bit PCI video card that is in circuit connection further with a monitor 230 through a bus 230B. Thus, neither sound card 276M, video card 274M nor empty bus slots is powered, thus totally eliminating any power waste inevitably incurred by a conventional computer system placed in the conventional standby state.

Bus connectors are also I/O connectors in nature. FIG. 2 shows that peripheral drives including hard-disk drive 240, CD drive 250, and floppy-disk drive 260 are connected respectively through buses 240B, 250B, and 260B to bus connectors that are part of switchable power-distributing circuitry 220M. On the other hand, a phone line 290 is coupled to slot 271K that is part of keep-alive power-distributing circuitry 220K. Also part of keep-alive power-distributing circuitry 220K are connectors currently connected by a keyboard 285 and a mouse 280.

All of the elements or circuitry disposed on energy-conserving motherboard 220 can be categorized into two groups, i.e., a keep-alive group of circuitry with reference numerals ended with "K" (including keep-alive power connector 221K, keep-alive CPU circuitry 222K, keep-alive memory modules 223K, and keep-alive expansion slots 271K–273K) and a switchable group of circuitry with reference numerals ended with "M" (including main power connector 221M, main CPU circuitry 222M, and switchable expansion slots 274M–276M). The keep-alive group of circuitry includes not only keep-alive memory modules 223K but a CMOS clock circuit (not shown) that is required for continuously providing a current time and date, while the switchable group of circuitry is selectively energized by switchable power-distributing circuitry 220M only when needed. To facilitate installation, the connectors comprised in the keep-alive power-distributing circuitry (especially keep-alive power connector 221K, slots 223K and 271K–273K) may be adapted into a green color, while the switchable power-distributing circuitry (especially main power connector 221M, slots 223M and 274M–276M) are in red. Another alternative is to respectively label the power connectors and slots, so as to render the keep-alive and the switchable connectors (or slots) visually distinguishable from each other for the purpose of detachably establishing circuit communication with corresponding keep-alive and switchable circuit cards (including memory modules) properly.

In brief, energy-conserving motherboard 220 comprises (a) keep-alive power-distributing circuitry 220K for continuously distributing low-amperage keep-alive DC power to at least one connector (or bus slot) each for detachably establishing circuit communication with a circuit board (or a memory module) to be kept alive, (b) a first group of circuitry in power connection with the keep-alive power-distributing circuitry, wherein the first group of circuitry includes keep-alive memory (preferably, SRAM) for storing task information to be retained and preferably keep-alive microprocessor (or CPU) circuitry, (c) switchable power-distributing circuitry 220M comprising switching means for selectively supplying high-amperage regulated main DC power, only when needed, to a plurality of connectors for detachably establishing circuit communication with circuit cards to be selectively powered by the main DC power, and (d) a second group of circuitry in power connection with the switchable power-distributing circuitry, wherein the second group of circuitry includes volatile memory and main microprocessor circuitry. This renders energy-conserving computer system remotely accessible through a modem and instantaneously restorable to resume previous activity, through use of the very least amount of power technologically possible.

Keep-alive CPU circuitry 222K renders energy-conserving computer system 200 controllable from the keep-alive state without requiring additional hardware such as a power management circuit board utilized in conventional practice. The keep-alive state of the present invention possesses all functions available to a conventional operating state, yet consumes power not much different from a conventional power-off state. In contrast, a conventional computer system in the power-off state is totally inaccessible unless being manually powered up and going through a time-consuming booting process.

Keep-alive memory modules 223K renders energy-conserving computer system 200 instantaneously restorable especially to resume previous activities if detecting a signal from mouse 280 or keyboard 285. In contrast, the conventional computer system cannot retain its previous activity once entering the power-off state and inevitably requires a time-consuming booting process that is not practical for facsimile and telephone-answering applications.

Figure 3:
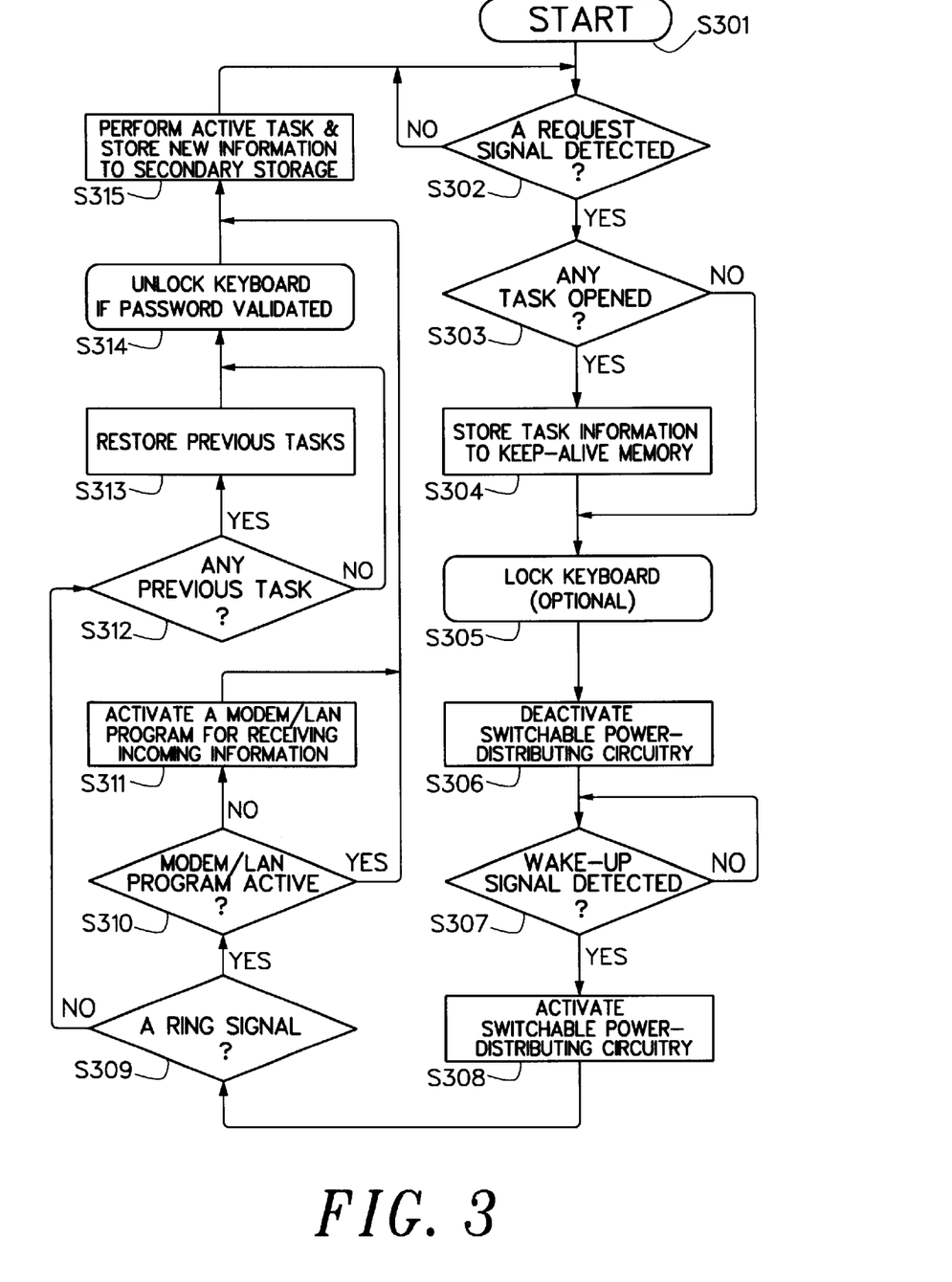
FIG. 3 is a flowchart showing an operating system for rendering an energy-conserving computer system instantaneously actuatable in between a keep-live state and an operating state, in accordance with a third primary preferred embodiment of the present invention.

Referring now to FIG. 3, a third primary embodiment of the present invention is an operating system for use in conjunction with power management software and more preferably with a manual-operable button 281 (FIG. 2) that interacts microprocessor 222 through an interfacing line 28 IC so as to instantly and automatically save opened (or modified) files, store task information to be kept alive, and thus enter the keep-alive state. Note that "S" stands for "Step" hereinafter. The operating system comprises a set of basic instructions that can be hardwired to a ROM chip (i.e., nonvolatile but non-changeable) or loaded to a keep-alive SRAM module through software installation so as to be resident on the keep-alive memory and readily executable by microprocessor 222 (especially, keep-alive CPU circuitry 222K), once the energy-conserving computer system is powered at the first time (S301). When a request signal (S302) to enter the keep-alive state of the present invention is detected, microprocessor 222 is instructed to store task information reflecting the operating activity of energy-conserving computer system 200 (especially in main memory modules 223M) to keep-alive memory modules 223K if there exists any task or file opened (S303 and S304), and then to optionally lock keyboard 285 (S305) and to deactivate all switchable power-distributing circuitry (S306). If no opened task, it is instructed to route from S303 directly to S305. Preferably, the task information includes the names of any software programs and files currently opened as well as the activeness status of the software programs and the files.

The request signal can be actuated either manually by manual-operable button 281 or automatically through software in which the keep-alive state is activated when microprocessor 222 detects no activity from any software programs currently opened and from keyboard 285 as well as mouse 280 upon reaching a preset period of time. Then, energy-conserving computer system 200 enters the keep-alive state and waits for a wake-up signal (S307), in which main DC power (through power line 214M and then main power connector 221M) is not suppled to switchable power-distributing circuitry 220M.

If detecting a wake-up signal, keep-alive CPU circuitry 222K actuates relay 214R to distribute switchable DC-power supply 214S so as to actuate switchable power-distributing circuitry 220M (S308) in order to enter an operating state. If the wake-up signal is a ring signal (S309) and no modem/LAN program (S310) is active, microprocessor 222 activates a modem/LAN program so as to be remotely connectable for receiving incoming information or for recording voice data (S311). If there is a modem/LAN program, the process is routed to S315 so as to perform an active task and to store new information (either facsimile, e-mail, or voice data) temperately stored in main memory modules 223M (i.e., volatile primary memory storage) to nonvolatile primary memory storage (such as a primary memory-storage card, a battery-powered RAM or SRAM card, and their combinations) or secondary storage (such as hard-disk drive 240 or CD drive 250). Note that keep-alive memory modules 223K and main memory modules 223M are both considered to be primary memory storage with characteristics of random and instantaneous accessibility, as compared with secondary memory storage that is not directly accessible by its host microprocessor and slow in speed.

Should a wake-up signal is not a ring signal, the process is routed to S312 to instruct microprocessor 222 to check if keep-alive memory modules 221K retain task information of any previous activity. If yes, any previous tasks will be restored (S313) to main memory modules 223M. The restoring includes not only the software programs but the files previously opened. Keep-alive memory modules 223K with a reduced storage capacity (for the purpose of further reducing power consumption) stores only vital and concise information such as the names of the software programs and the files opened, while main memory modules 223M are used for loading the contents of the software programs needed to be opened and operative. Preferably, the cursor on the screen of monitor 230 also returns to its previous active position. If no previous task exists, the process is routed from S312 to S314. In S314, logging password will be validated before granting a user an access to the energy-conserving computer system 200. The user can also manually perform any task and store new information to secondary memory storage (S315). Finally, the process is routed backed to S302, waiting for a request signal (either manually activated by manual-operable button 281 or automatically actuated through software) to be detected so as to enter the keep-alive state again. Thus, the present invention totally eliminates the conventional, time-consuming, manual shutdown and booting processes for the first time.

Figure 4:
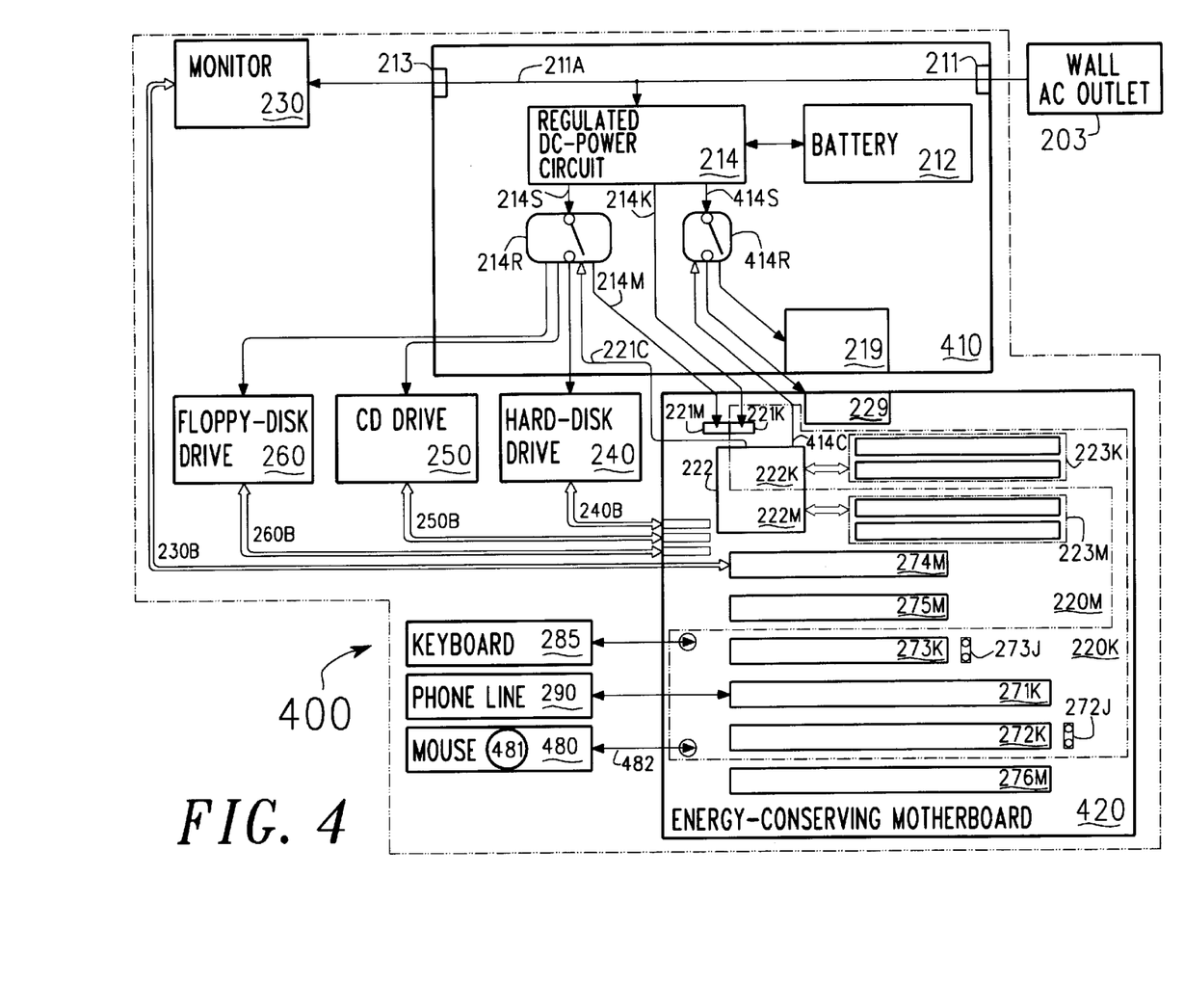
FIG. 4 is a block diagram of an energy-conserving computer system comprising two switchable DC power-distributing circuitry and an energy-conserving mouse arranged in accordance with the first, second, third, and fourth primary preferred embodiments of the present invention.

Referring now to FIG. 4, illustrated is an energy-conserving computer system 400 with an energy-conserving power-supply system 410 with two switchable DC power-distributing circuitry in accordance with the first, second, third, and fourth primary preferred embodiments of the present invention. Energy-conserving computer system 400 having an energy-conserving motherboard 420 with components nearly identical to energy-conserving computer system 200 displayed in FIG. 2, but a novel mouse 480 for manually actuating the keep-alive state and an additional relay 414R for selectively distributing switchable DC power 413S to fans 219 and 229. The activity of relay 414R is controlled by keep-alive CPU circuitry 222K through an interfacing line 414C. Preferably, relay 414R is a thermostat (i.e., a temperature-sensitive switch) arranged in such a manner as to be actuated at the time when detecting that the temperature inside energy-conserving computer system 400 or preferably microprocessor 222 exceeds a preset value of temperature. In any events, the additional relay allows the activities of fans 219 and 229 to be controlled separately from host and peripheral devices including energy-conserving motherboard 220, hard-disk drive 240, CD drive 250, floppy-disk drive 260, keyboard 285, and mouse 480.

In accordance with the fourth preferred embodiment of the present invention, a manually-operable button 481 (to replace manual-operable button 281 shown in FIG. 2) is afforded on mouse 480 for manually requesting microprocessor 422 to issue a control signal through an interfacing means 482 to instruct the energy-conserving computer system through the operating system shown in FIG. 3 to enter the keep-alive state. The function of requesting actuated by manual-operable button 481 may be similarly achieved by simultaneously holding the left and the right buttons of a convention mouse, if the mouse circuitry is designed so. On the other hand, the physical line of interfacing means 482 used for establishing circuit communication between manual-operable button 481 and energy-conserving motherboard 420 may be replaced by a remote-type transmitting means such as an infrared transmission mouse.

Figure 5:
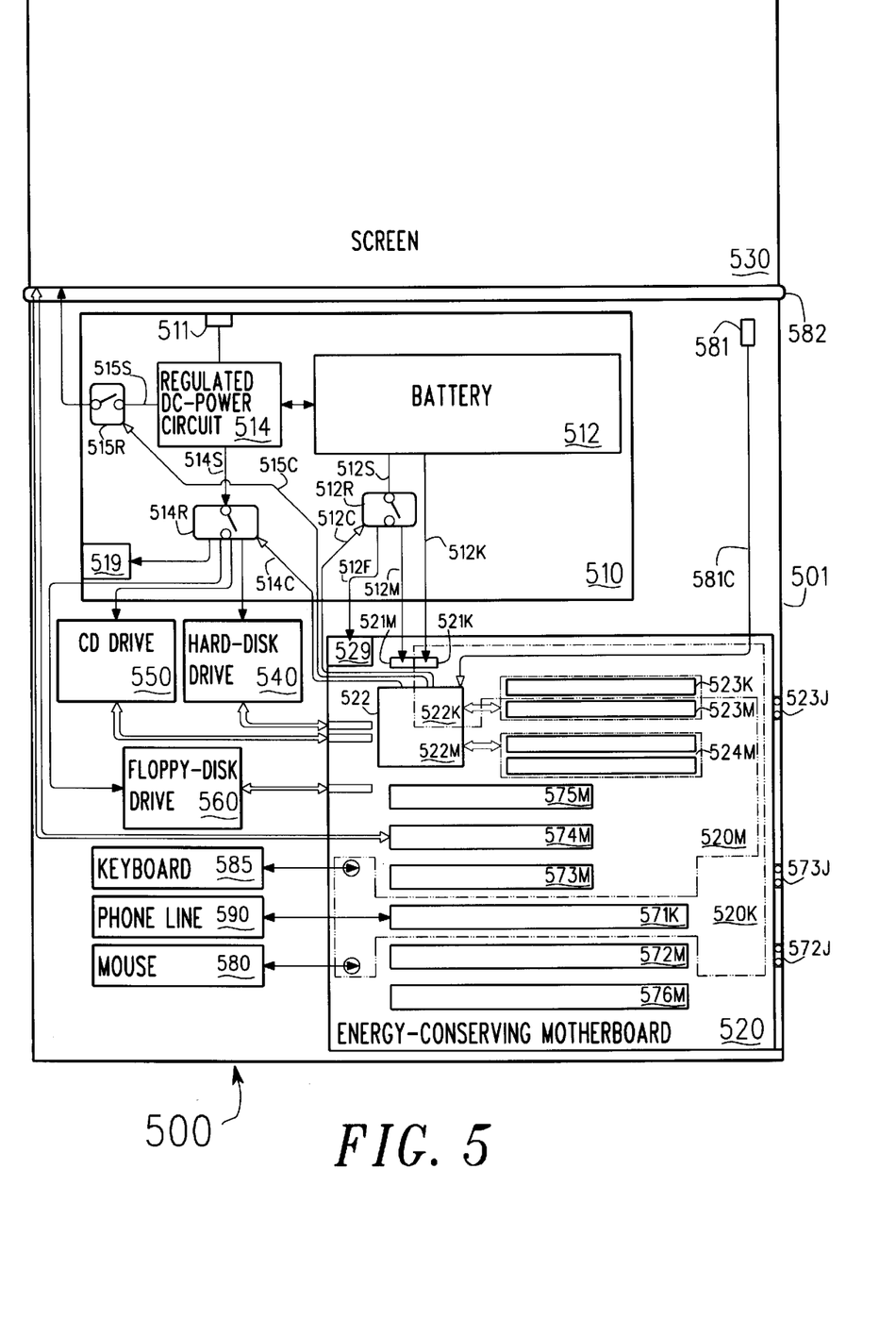
FIG. 5 is a block diagram of an energy-conserving notebook computer comprising keep-alive and switchable power-distributing circuitry arranged for further illustrating a fifth primary preferred embodiment of the present invention.

Referring now to FIG. 5, the fifth primary preferred embodiment of the present invention is further illustrated in an energy-conserving notebook computer 500 having an energy-conserving power-supply system 510 with two switchable DC power-distributing circuitry and an energy-conserving motherboard 520 with (a) an operable button 581 for requesting a microprocessor 522 through an interfacing line 581C to automatically enter its keep-alive state, and (b) three jumpers disposed on an external surface of an housing 501 for selectively reconfiguring keep-alive power-distributing circuitry 520K and switchable power-distributing circuitry 520M so as to further conserve energy, in which a jumper 523J is currently positioned to reduce the capacity of keep-alive memory to one slot (i.e., 523K), and jumpers 522J and 523J disable the keep-alive status of slots 572M and 573M.

Specifically comprised in keep-alive power-distributing circuitry 520K are I/O connector means for detachably mounting a keep-alive memory module 523K, a modem card 571K, keep-alive CPU circuitry 522K, a keyboard 585, and a mouse 580. On the other hand, switchable power-distributing circuitry 520M includes connector means for detachably mounting volatile memory modules 523M and 524M, a video card 574M, a monitor 530, main CPU circuitry 522M, a hard-disk drive 540, a CD drive 550, and a floppy-disk drive 560.

Energy-conserving power-supply system 510 comprises (a) keep-alive DC power 512K currently coupled to keep-alive power connector 521K, (b) first switchable power 512S controllable by a relay 512R for selectively distributing power to main power connector 521M and a fan 529 respectively through power lines 512M and 512F, (c) second switchable power 514S controllable by a relay 514R for selectively distributing DC power to hard-disk drive 540, CD drive 550, floppy-disk drive 560, and a fan 519, and (d) third switchable power 515S controllable by a relay 515R for selectively energizing a screen 530. Relays 512R, 514R, and 515R are controlled by keep-alive and main CPU circuitry 522K and 522M through interfacing lines 512C, 514C, and 515C, respectively. Only when first switchable power 512S is actuated, main DC power will through main power connector 521 M energize volatile memory modules 523M and 524M (for storing information randomly accessible by microprocessor 522) and other circuitry in power connection with switchable power-distributing circuitry 520M.

A rechargeable battery 512 is afforded for distributing keep-alive power 512K, first switchable power 512S, and second switchable power 514S. Further afforded is a regulated DC-power circuit 514 for converting AC power if available from an AC-power receptacle 511 to regulated DC power so as to energize rechargeable battery 512 and to actuate second and third switchable power 514S and 515S.

Housing 501 is provided for disposing therein energy-conserving power-supply system 510, energy-conserving motherboard 520, and peripheral drives mentioned hereinabove. Joined to housing 501 is screen 530 swingable about hinge means 582 in between a currently opened position and a closed position, in which screen 530 is respectively viewable and non-viewable. Operable button 581, screen 530, and housing 501 are further adapted in such a manner as to allow operable button 581 to be released in the opened position and to be pressed in the closed position, so as to interface keep-alive CPU circuitry 522K for placing energy-conserving power-supply system 510 automatically into the full operating state and the keep-alive state. Preferably, keep-alive memory module 523K contains a first set and a second set of instructions. Provided for entering the keep-alive state when screen 530 is moved to the non-viewable (i.e., closed) position, the first set of instructions comprises the steps of (a) activating second switchable power 514S to energize peripheral drives, (b) saving any opened (especially, modified) files to a nonvolatile memory-storage means selected from the group consisting a primary memory-storage card, a battery-powered RAM card, a battery-powered SRAM card, a secondary memory-storage or peripheral drive (such as a hard-disk drive 540, CD drive 550, or floppy-disk drive 560), and their combinations, (c) storing (or updating) task information needed to be kept alive to keep-alive memory module 523K, and (d) deactivating all switchable power-distributing circuitry. On the other hand, the second set of instructions afforded for entering the full operating state and then a partial operating state when screen 530 is moved to the opened position, includes the steps of (a) activating all switchable power-distributing circuitry, (b) restoring the previous tasks to volatile memory modules 523M and/or 524M in accordance with the task information, and (c) deactivating second switchable power-distributing circuitry so as not to distribute power to peripheral drives.

The key feature of energy-conserving notebook computer 500 is the partial operating state, in which switchable power-distributing circuitry 520M is actuated, but not second switchable power 514S. The contents of the files opened or being manipulated through a software program are manipulated in keep-alive memory module 523K, which corresponds nearly to a conventional RAM disk, except that the keep-alive memory modules of the present invention are nonvolatile in effect. Once software programs (including an operating system) and the files are loaded respectively to volatile memory modules 524M and keep-alive memory module 523K, there is no need for microprocessor 522 to access secondary memory storage for the same information. Consequently, energy-conserving notebook computer 500 can operate at the electrical speed of random access memory rather than relying on the mechanical movement of secondary memory storage. Only when needed, the full operating state is actuated and power is supplied to secondary memory storage. Jumper 523J allows energy-conserving notebook computer 500 to expand the capacity of keep-alive memory to two slots (i.e., 523K and 523M) so as to enhance the partial-operating feature. Thus, not only is the battery life greatly extended, but the processing efficiency of the battery-powered notebook computer is substantially improved.

Most importantly, energy-conserving notebook computer 500 is able automatically and instantaneously to resume previous activities and to enter the keep-alive state by simply moving the screen to the viewable position and the non-viewable position, respectively.

In contrast, a conventional notebook computer or desktop computer will use the same battery for lesser hours and performs fairly sloppily as an associated hard-disk drive has to be frequently switched in between a sleep mode or an operating mode (for instance, in order to save data files thereto). The frequent on-and-off switching may further accelerate mechanical failure of the hard-disk drive.

Figure 6:
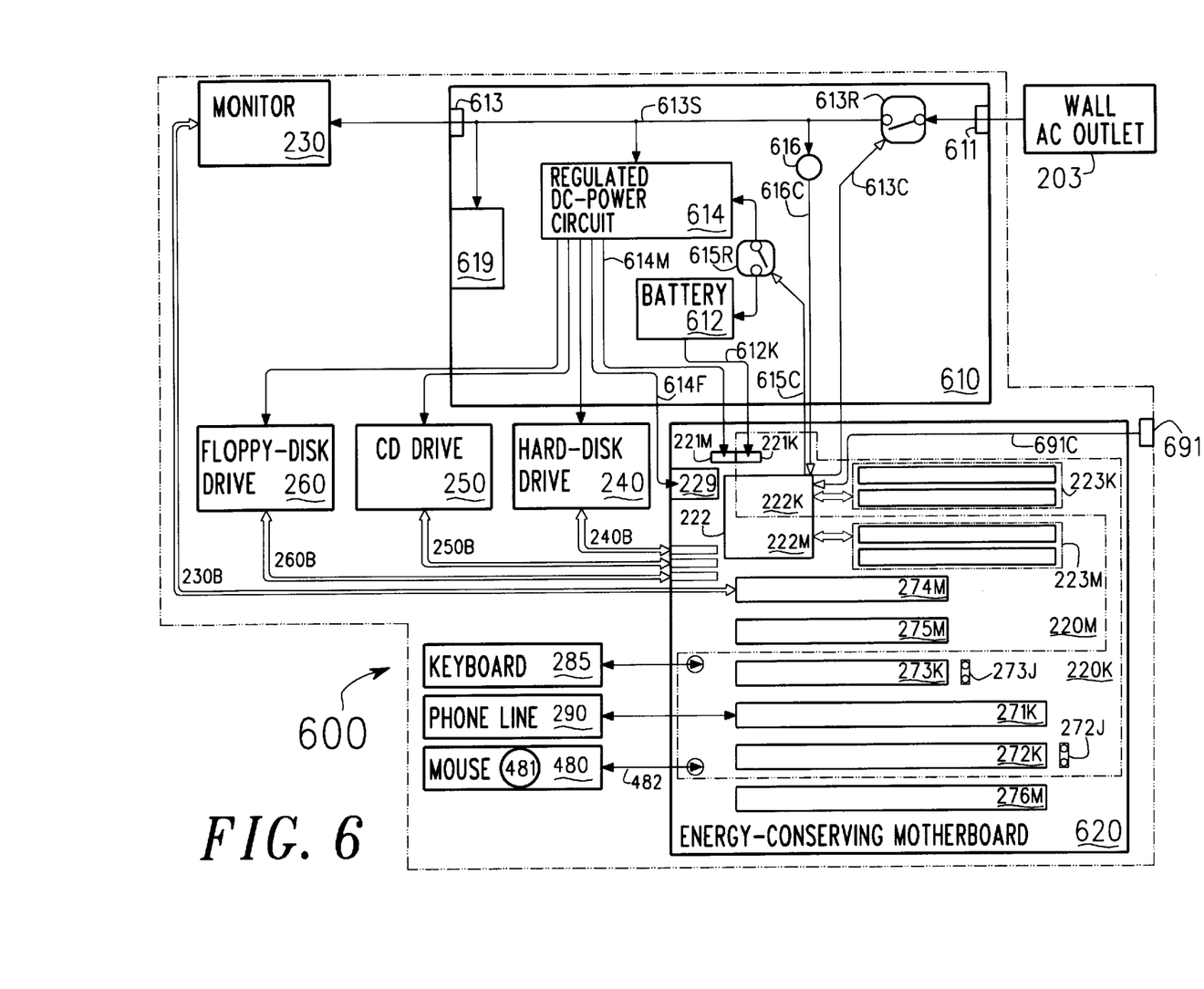
FIG. 6 is a block diagram of an energy-conserving computer system comprising keep-alive power-distributing circuitry and switchable AC and DC power-distributing circuitry arranged in an alternative of the present invention.

Referring now to FIG. 6, the fifth primary embodiment of the present invention is further illustrated using an energy-conserving computer system 600 with an energy-conserving power-supply system 610 that is distinct in having battery-powered keep-alive power-distributing circuitry and switchable AC and DC power-distributing circuitry. Specifically, energy-conserving power-supply system 610 comprises a relay 613R for selectively distributing AC power received through receptacle 611, a rechargeable battery 612 for supplying keep-alive DC power 612K to keep-alive power-distributing circuitry 220K, and a relay 615R for selectively distributing backup DC power from rechargeable battery 612 to regulated DC-power circuit 614. Keep-alive DC power 612K may be selected from the group consisting of at least one non-rechargeable battery cell, at least one rechargeable battery cell, at least one dynamo, at least one solar cell, at least one fuel cell, and their combinations. Regulated DC-power circuit 614 distributes various switchable regulated DC-power supplies not only to peripheral drives but to main power connector 221M (through a power line 614M) as well as to fan 229 (through a power line 614F) for dissipating heat generated by main CPU circuitry 222M. Relay 613R controlled by keep-alive CPU circuitry 222K through an interfacing line 613C is utilized to control the supply of switchable AC power 613S to regulated DC-power circuit 614, to an AC fan 619 (disposed on a housing of energy-conserving power-supply system 610), and to an AC outlet 613 (to monitor 230). Because of consuming no AC power at all in the keep-alive state, the energy-conserving computer system will conserve power consumption to the greatest extent just as a modern wall clock capable of running a full year around through utilizing the power of a single 1.5V battery.

Further afforded in FIG. 6 is a hardware-type lock (which may contain a sensor device capable of detecting a coded card) 691 for replacing or enhancing the operating system shown in FIG. 3, which renders energy-conserving computer system 600 selectively inaccessible and accessible by keyboard 285 and thus to prevent unauthorized accessing. Hardware-type lock 691 interfaces keep-alive CPU circuitry 222K through an interfacing line 691C for performing the functions of locking and unlocking. When locked by hardware-type lock 691, energy-conserving computer system 600 is inaccessible by keyboard 285 but is capable of receiving facsimile information and accessible remotely through phone line 290 if a valid password is entered.

A power-line monitor 616 is further provided for monitoring the continuous presence of AC power, when relay 613R is actuated, i.e., in an operating state. Should wall AC outlet 203 suddenly cease supplying the AC power for any reasons during the operating state, power-line monitor 616 sends a signal through an interfacing line 616C to microprocessor 222 to actuate relay 615R so as to supply backup DC power from rechargeable battery 612 to regulated DC-power circuit 614 for distribution. Alternatively, as long as relay 613R is actuated for supplying switchable AC power 613S, relay 615R will be kept activated so as to allow rechargeable battery 612 to be charged in the presence of the switchable AC power and to supply the backup DC power without any interruption to regulated DC-power circuit 614 in the sudden absence of the switchable AC power. Preferably, relay 615R is used in conjunction with the operating system displayed in FIG. 3, so that it will require only a very small amount of backup DC power from rechargeable battery 612 to safely and quickly force the operating state to enter the keep-alive state through executing the set of basic instructions (specifically, S304), in which the files will be automatically saved to peripheral storage and task information reflecting the current task activities of the energy-conserving computer system will be updated to keep-alive memory modules 223K. Once enters the keep-alive state, relay 615R is deactivated so as to cease the supplying of the backup DC power to regulated DC-power circuit 614.

Because power distribution is reconfigurable and confined to the keep-alive power-distributing circuitry, energy-conserving computer system 600 thus utilizes the least amount of power technologically possible in the keep-alive state. Equally important is that the energy-conserving computer system is rendered remotely accessible by a modem and instantaneously restorable to resume previous activity. In contrast, to obtain these convenient features, a conventional computer system needs to be continuously powered, not only incurring substantial energy waste but endangering mechanical/electronic durability.

Although these preferred embodiments have been described hereinbefore as applied to a personal computer system, the present invention is applicable to other server and super computer system as well as to any information-processing apparatus to be operable manually, automatically, remotely, and instantaneously from the keep-alive state through the least amount of power technologically possible. Thus, it is clearly understood that such embodiments are provided by way of illustration and example only and are not to be taken by way of limitation as numerous variations, changes, modification, and substitutions will occur to those skilled in the art without departing from the invention herein. Accordingly, it is intended that the invention be limited only by the spirit and scope of the appended claims.

What is claimed is:

1. An energy-conserving computer system comprising:
   (a) keep-alive power-distributing circuitry for continuously distributing keep-alive DC power;
   (b) a first group of circuitry in power connection with said keep-alive power-distributing circuitry, said first group of circuitry comprising keep-alive memory means for storing task information needed to be kept alive;
   (c) switchable power-distributing circuitry comprising switching means and a plurality of input/output connector means, wherein said switching means is provided for selectively distributing main DC power to said plurality of input/output connector means, and said plurality of input/output connector means each is provided for detachably establishing circuit communication with a circuit card; and
   (d) a second group of circuitry in power connection with said switchable power-distributing circuitry, said second group of circuitry comprising main microprocessor circuitry.

2. The energy-conserving computer system of claim 1 further comprising means for generating said keep-alive DC power and said main DC power, from an external AC-power source.

3. The energy-conserving computer system of claim 1 further comprising means for supplying said keep-alive DC power and said main DC power, wherein said means for supplying is selected from the group consisting of at least one non-rechargeable battery cell, at least one rechargeable battery cell, at least one dynamo, at least one solar cell, at least one fuel cell, and their combinations.

4. The energy-conserving computer system of claim 1 further comprising (a) first means for supplying said keep-alive DC power, wherein said first means is selected from the group consisting of at least one non-rechargeable battery cell, at least one rechargeable battery cell, at least one dynamo, at least one solar cell, at least one fuel cell, and their combinations, and (b) second means for generating said main DC power from an external AC-power source.

5. The energy-conserving computer system of claim 4, wherein said first means and said second means are arranged in such a manner as to allow said first means to supply backup DC power to said second means, when said external AC-power source suddenly ceases the supplying of AC power.

6. The energy-conserving computer system of claim 1 further comprising:
   (a) first means for supplying said keep-alive DC power, selected from the group consisting of at least one non-rechargeable battery cell, at least one rechargeable battery cell, at least one dynamo, at least one solar cell, at least one fuel cell, and their combinations;
   (b) second means for generating said main DC power from an external AC-power source, wherein said second means is adapted to receive backup DC power from said first means, when said external AC-power source suddenly ceases the supplying of AC power;
   (c) second switching means for selectively distributing said backup DC power from said first means to said second means; and
   (d) a set of instructions including the steps of (i) saving any modified files to nonvolatile memory storage, (ii) updating said task information needed to be kept alive, and (iii) requesting said second switching means to cease the supplying of said backup DC power from said first means to said second means.

7. The energy-conserving computer system of claim 1 further comprising a rechargeable battery for supplying said keep-alive DC power and regulated DC-power circuitry for generating said main DC power from an external AC-power source, wherein said rechargeable battery and said regulated DC-power circuitry are arranged in such a manner as to allow said rechargeable battery to be recharged by said main DC power when said external AC-power source is present for generating said regulated DC power, and to allow said rechargeable battery to provide backup DC power to said regulated DC-power circuitry for distribution when said external AC-power source is suddenly absent.

8. The energy-conserving computer system of claim 1, wherein said first group of circuitry further comprises keep-alive microprocessor circuitry for controlling an activity of said switching means.

9. The energy-conserving computer system of claim 1, wherein said keep-alive power-distributing circuitry further comprises keep-alive input/output connector means each for detachably establishing circuit communication with a circuit board to be kept alive, and said first group of circuitry further comprises clock circuitry.

10. The energy-conserving computer system of claim 1, wherein said keep-alive power-distributing circuitry further comprises a first input/output connector means for detachably establishing circuit communication with said keep-alive memory means and additional input/output connector means each for detachably establishing circuit communication with a circuit board to be kept alive.

11. The energy-conserving computer system of claim 1, wherein said keep-alive power-distributing circuitry further comprises keep-alive input/output connector means rendered visually distinguishable from said plurality of input/output connector means comprised in said switchable power-distributing circuitry.

12. The energy-conserving computer system of claim 1, wherein said keep-alive power-distributing circuitry further comprises keep-alive input/output connector means labeled differently from said plurality of input/output connector means comprised in said switchable power-distributing circuitry.

13. The energy-conserving computer system of claim 1 further comprising means for changing the configuration between said keep-alive power-distributing circuitry and said switchable power-distributing circuitry.

14. The energy-conserving computer system of claim 1 further comprising a manual-operable means in circuit communication with said main microprocessor circuitry, for requesting (a) said task information to be updated in accordance with the operating activity of said energy-conserving computer system, and (b) said switchable power-distributing circuitry to be deactivated so as not to distribute said main DC power to said second group of circuitry.

15. The energy-conserving computer system of claim 1 further comprising a manual-operable means and a set of instructions, wherein said manual-operable means is provided for actuating said main microprocessor circuitry to execute said set of instructions, and said set of instructions comprises the steps of (a) saving any modified files to nonvolatile memory storage, (b) updating said task information needed to be kept alive, and (c) requesting said switchable power-distributing circuitry not to distribute said main DC power to said second group of circuitry.

16. The energy-conserving computer system of claim 15, wherein said set of instructions further comprises additional steps of (a) locking, in which the energy-conserving computer system is rendered inaccessible by a keyboard means, and (b) unlocking, in which the energy-conserving computer system is rendered accessible by said keyboard means only if a valid password is entered.

17. The energy-conserving computer system of claim 1 further comprising a keyboard means and means for selectively locking and unlocking said keyboard means, so as to render the energy-conserving computer system respectively inaccessible and accessible by said keyboard means.

18. The energy-conserving computer system of claim 1 further comprising an operating instruction for restoring previous tasks in accordance with said task information stored in said keep-alive memory when said switchable power-distributing circuitry is actuated for distributing said main DC power to said second group of circuitry.

19. The energy-conserving computer system of claim 1, wherein said switchable power-distributing circuitry further comprises a plurality of outlet means each for detachably establishing power connection with a peripheral device to be selectively energized by said main DC power.

20. The energy-conserving computer system of claim 1 further comprising:
(a) second switchable power-distributing circuitry comprising second switching means and a plurality of outlet means, wherein said second switching means is provided for selectively distributing second main DC power to said plurality of outlet means, and said plurality of outlet means each is provided for detachably establishing power connection with a peripheral device to be selectively energized;
(b) a nonvolatile memory-storage means coupled to one of said outlet means comprised in said second switchable power-distributing circuitry;
(c) means for supplying said keep-alive DC power, said main DC power, and said second main DC power, wherein said means for supplying is selected from the group consisting of at least one non-rechargeable battery cell, at least one rechargeable battery cell, at least one dynamo, at least one solar cell, at least one fuel cell, and their combinations;
(d) volatile memory means in power connection with said switchable power-distributing circuitry, for storing information only when said switchable power-distributing circuitry is actuated; and
(e) a housing for disposing therein said keep-alive power-distributing circuitry, said first group of circuitry, said switchable power-distributing circuitry, said second group of circuitry, said second switchable power-distributing circuitry, said nonvolatile memory-storage drive, said means for supplying, and said volatile memory means.

21. The energy-conserving computer system of claim 20 further comprising means for generating regulated DC power from an AC-power supply, wherein said means for supplying and said means for generating are arranged in such a manner as to allow said means for generating to supply said regulated DC power to said means for supplying, so as to supply said main DC power and said second main DC power when said AC-power supply is present for generating said regulated DC power.

22. The energy-conserving computer system of claim 20 further comprising means disposed on an external surface of said housing, for manually changing the configuration between said keep-alive power-distributing circuitry and said switchable power-distributing circuitry.

23. The energy-conserving computer system of claim 20 further comprising an operable means and a screen, wherein said operable means, said screen, and said housing are adapted in such a manner as to allow said operable means to actuate selectively a keep-alive state in which said switchable power-distributing circuitry and said second switchable power-distributing circuitry are deactivated when said screen is moved to a non-viewable position and an operating state in which said switchable power-distributing circuitry and said second switchable power-distributing circuitry are activated when said screen is moved to a viewable position.

24. The energy-conserving computer system of claim 23 further comprising a set of instructions resided in said keep-alive memory means that will be automatically executed when said screen is moved to said non-viewable position, wherein said set of instructions comprises the steps of (a) actuating said second switchable power-distributing circuitry, (b) saving any modified files to said nonvolatile memory-storage means, (c) updating said task information needed to be kept alive in said keep-alive memory means, and (d) deactivating said switchable power-distributing circuitry and said second switchable power-distributing circuitry, so as to enter said keep-alive state.

25. The energy-conserving computer system of claim 23 further comprising a set of instructions resided in said keep-alive memory means that will be automatically executed when said screen is moved to said viewable position, wherein said set of instructions comprises the steps of (a) actuating said switchable power-distributing circuitry and said second switchable power-distributing circuitry, (b) restoring previous tasks in accordance with said task information to said volatile memory means, and (c) entering a partial operating state, in which said switchable power-distributing circuitry remains activated but said second switchable power-distributing circuitry is deactivated.

26. The energy-conserving computer system of claim 20 further comprising (a) third switchable power-distributing circuitry comprising third switching means for selectively supplying third DC power, (b) cooling means coupled to said third switchable power-distributing, for dissipating heat.

27. The energy-conserving computer system of claim 26, wherein said third switching means is adapted to be temperature sensitive so as to actuate said cooling means when the temperature inside said energy-conserving computer system exceeds a preset value.

28. The energy-conserving computer system of claim 1 further comprising (a) second switchable power-distributing circuitry comprising additional switching means for selectively supplying power selected from the group consisting of DC power, AC power, and regulated DC power, and (b) cooling means coupled to said second switchable power-distributing circuitry, for dissipating heat.

29. The energy-conserving computer system of claim 28, wherein said additional switching means is adapted to be temperature sensitive so as to actuate said cooling means when the temperature inside said energy-conserving computer system exceeds a preset value.

30. An energy-conserving motherboard comprising:
 (a) keep-alive power-distributing circuitry for distributing keep-alive DC power, wherein said keep-alive power-distributing circuitry comprises means for connecting at least with keep-alive memory means to be kept alive by said keep-alive DC power; and
 (b) switchable power-distributing circuitry for selectively distributing main DC power, wherein said switchable power-distributing circuitry comprises a plurality of input/output connector means for establishing circuit communication with circuit cards to be selectively energized by said main DC power.

31. The energy-conserving motherboard of claim 30 further comprising microprocessor means that contains keep-alive microprocessor circuitry and main microprocessor circuitry in power connection respectively with said keep-alive power-distributing circuitry and with said switchable power-distributing circuitry.

32. The energy-conserving motherboard of claim 30 further comprising keep-alive memory means in power connection with said keep-alive power-distributing circuitry.

33. The energy-conserving motherboard of claim 30, wherein said means for connecting comprised in said keep-alive power-distributing circuitry is adapted to comprise keep-alive input/output connector means for detachably establishing circuit communication with keep-alive memory means and with at least one circuit board to be kept alive.

34. The energy-conserving motherboard of claim 33, wherein said keep-alive input/output connector means comprised in said keep-alive power-distributing circuitry are rendered visually distinguishable from said plurality of input/output connector means comprised in said switchable power-distributing circuitry.

35. The energy-conserving motherboard of claim 30 further comprising means for changing the configuration between said keep-alive power-distributing circuitry and said switchable power-distributing circuitry.

36. The energy-conserving motherboard of claim 30 further comprising main microprocessor circuitry coupled to said switchable power-distributing circuitry, an interfacing means in circuit communication with said main microprocessor circuitry, and a primary memory-storage means stored therein a set of instructions, wherein said interfacing means is provided for transmitting a signal issued from an external manual-operable means so as to request said main microprocessor circuitry to execute said set of instructions, and said set of instructions comprises the steps of (a) updating said task information needed to be kept alive, and (b) requesting said switchable power-distributing circuitry not to distribute said main DC power.

\* \* \* \* \*

UNITED STATES PATENT AND TRADEMARK OFFICE
CERTIFICATE OF CORRECTION

PATENT NO. : 6,341,354 B1
DATED : January 22, 2002
INVENTOR(S) : Howard Hong-Dough Lee It is certified that error appears in the above-identified patent and that said Letters Patent is hereby corrected as shown below:

Column 1,
Line 5, after the title of the invention, please add the following sentence, -- The patent is a continuation in part of U.S. Patent No. 6,098,175 and claims priority thereto under 35 U.S.C. § 120. --

Column 2,
Line 36, please change "09/026,032" to -- 09/028,032 --

Signed and Sealed this

Eighth Day of March, 2005

JON W. DUDAS
*Director of the United States Patent and Trademark Office*